April 15, 1958 G. MILLER ET AL 2,830,878
PROCESS FOR CONCENTRATION OF SOLUBLE ELECTROLYTES
Filed Aug. 5, 1950 3 Sheets-Sheet 3
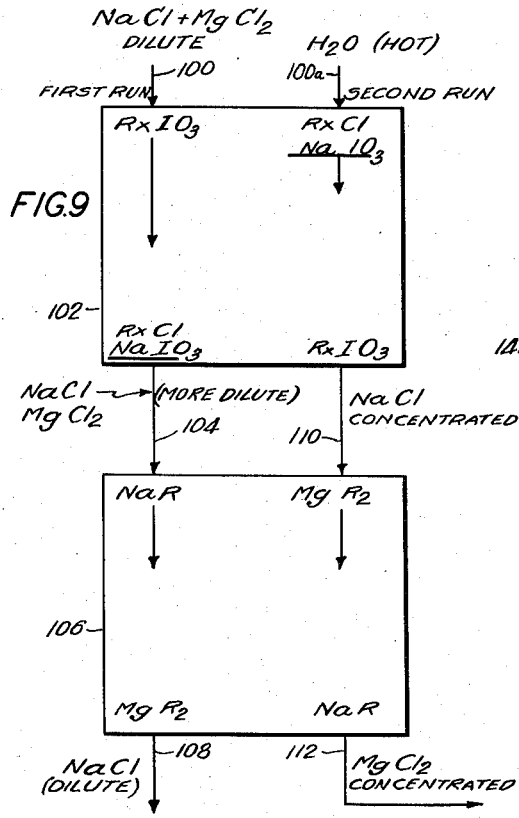
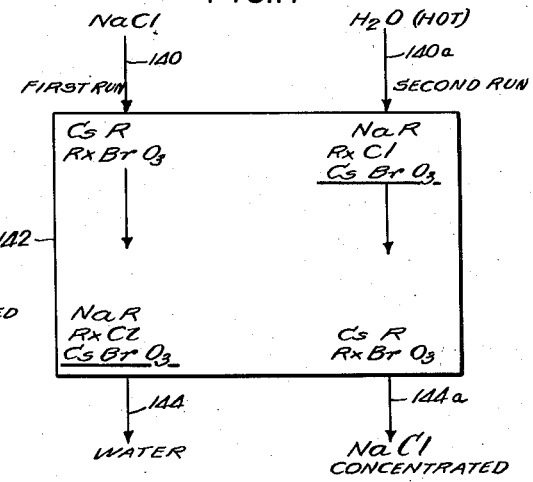
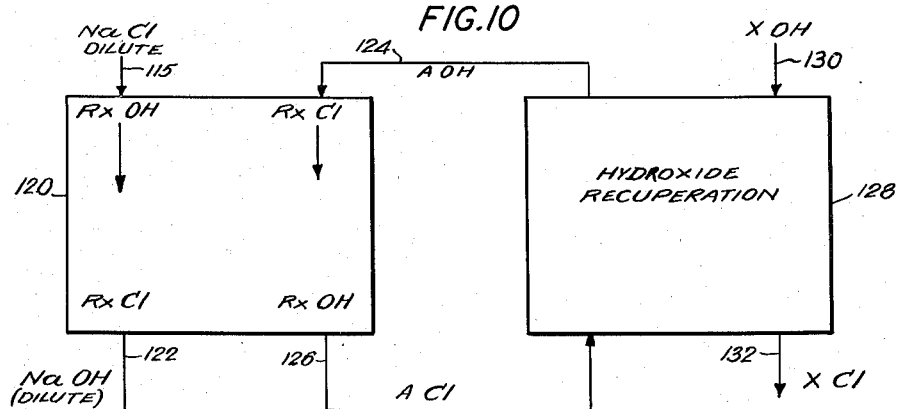
INVENTORS
GEORGE MILLER
F. CHASE GODFREY
BY
ATTYS.

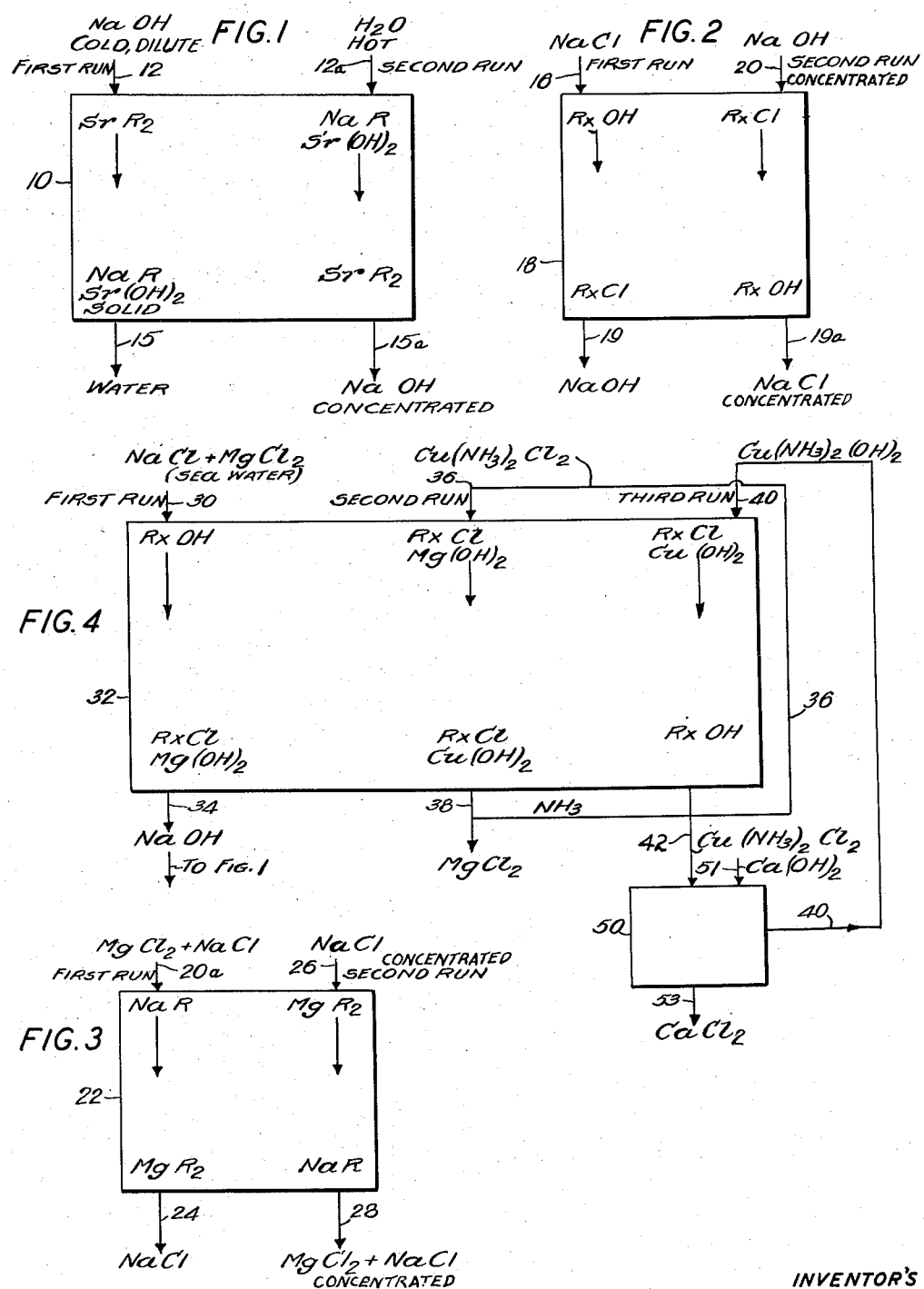

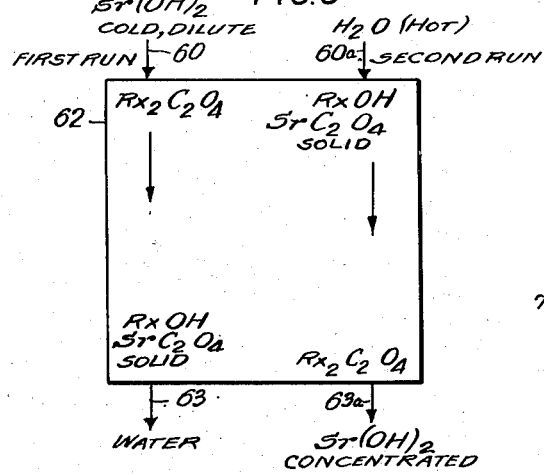
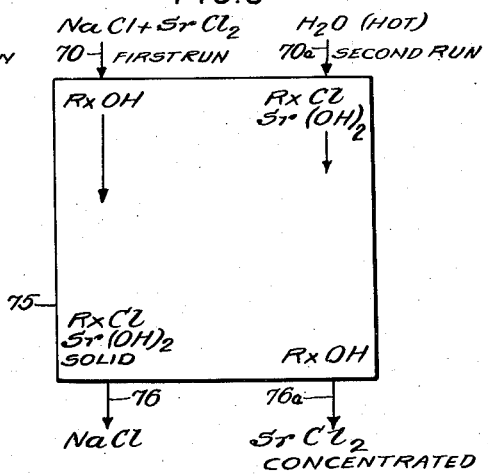
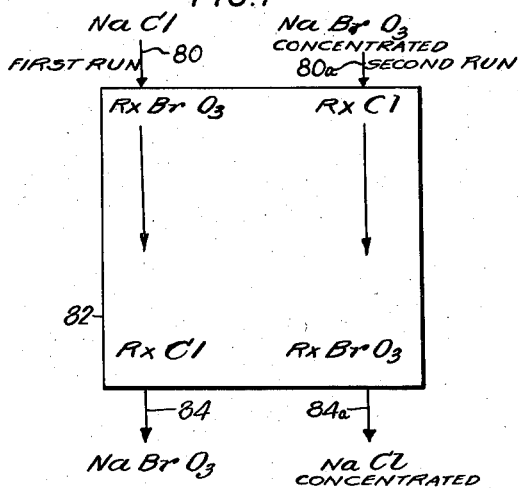
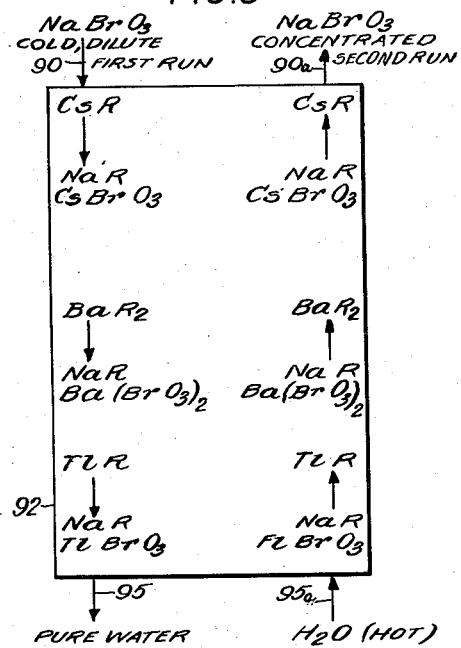

United States Patent Office 2,830,878
Patented Apr. 15, 1958

2,830,878

PROCESS FOR CONCENTRATION OF SOLUBLE ELECTROLYTES

George Miller, Barranquilla, Colombia, and Frank C. Godfrey, Boston, Mass.

Application August 5, 1950, Serial No. 177,886

4 Claims. (Cl. 23—184)

This invention relates to the concentration of ionized soluble electrolytes, including acids, bases and salts, by ion exchange.

The invention is useful, for instance, in the production of industrial chemicals, in refining processes such as for sugar, in processing alcoholic beverages, in the desalting of brine solutions, particularly sea water and the isolation and concentration of the salts therefrom and in the production of potable water from the sea. The salts of the sea are industrially valuable, but the heretofore known methods of isolating and concentrating them have been too expensive to prove commercially feasible. In the absence of economical and efficient concentration processes, only such salts which have been concentrated in nature are commercially useful. These are only a few of the uses to which the invention may be put as will be apparent from the description. It makes available many new raw resources and useful processes which may be based on it.

Essentially the invention is an ion exchange process which takes advantage of the property of certain ionizable compositions, which we have discovered can be produced by ion exchange, of having substantial variation in solubility with slight variations in temperature.

The inventive process comprises removing an electrolyte from a solution of the same and reproducing said electrolyte in a second solution in order to convert a weak solution of such electrolyte into a stronger solution of the same or to form a substantially pure solution of such electrolyte from a solution of the same containing impurities and other soluble compounds. This is done by passing such first solution through an ion exchanger having an ion capable of combining with an ion in such electrolyte to form a compound which is highly water soluble at one temperature and highly water insoluble at a lower temperature, thereby forming a solution of such compound and converting the ion exchanger into an exhausted form having as exchangeable ions the remaining ions of such electrolyte, precipitating such compound from such solution thereof by maintaining the temperature of the solution below the precipitation point of the compound from such solution, dissolving such precipitate in water at a temperature at which the same is soluble in such water and regenerating the exhausted exchanger with the solubilized precipitate, producing as an exchanger effluent the second electrolyte solution. In the event that it is desired to form a more concentrated solution of the electrolyte, the amount of water used to dissolve the precipitate should be less than the amount of water in the original first electrolyte solution and the temperature should be such that the precipitate is soluble in such an amount of water. In the event it is desired to only purify the first solution, the amount of water in which the precipitate is dissolved is not important.

In the following description the present invention is illustrated by a few examples selected from the endless possibilities which it makes apparent and the scope of the claims is not intended to be limited to the illustrative examples contained in the description and in the schematic drawings more clearly illustrating the process, of which Fig. 1 is a schematic diagram of an ion exchange process for concentrating sodium hydroxide.

Fig. 2 is a schematic drawing of an ion exchange process for converting one electrolyte to another more suitable for concentration purposes according to the invention.

Fig. 3 is a schematic diagram of part of the process for producing potable water and concentrated sodium hydroxide from sea water according to the invention.

Fig. 4 is a schematic diagram of an anion exchange concentration process of the invention.

Fig. 5 is a schematic diagram of an anion exchange process for regenerating a hydroxide form of exchanger as used in the invention.

Fig. 6 is a schematic diagram of an anion exchange process for isolating and concentrating one of several salts in a solution.

Figs. 7 and 8 are schematic diagrams showing a chromatic or cascading ion exchange concentration process.

Fig. 9 is a schematic diagram of an alternative process for concentration of magnesium chloride from sea water by ion exchange.

Fig. 10 is a schematic diagram of a process for producing a concentrated sodium hydroxide from effluent of the process of Fig. 9.

Fig. 11 is a schematic diagram of a process for conversion and concentration of an electrolyte using mixed exchangers.

GENERAL DESCRIPTION

An ion is the smallest particle into which a substance in solution can be divided and still retain its identity and ionization or division into component positive ions or cations and negative ions or anions occurs when a composition is in solution. For each cation there is a corresponding anion. Thus, for instance, sodium hydroxide NaOH comprises molecules each formed of a positively charged sodium ion or cation Na— and a negatively charged hydroxyl ion or anion OH—. In solution, these ions (cation and anion) have the property of being able to separate or disassociate and to associate themselves with other oppositely charged ions from or in another substance or composition present in or in contact with the solution. This process is ion exchange and the other substance exchanges a similarly charged ion in return for the ion which becomes associated with it, which may associate itself with an oppositely charged ion of the first composition. This process is analogous to the exchange of partners between two couples on a dance floor.

An ion exchanger is any composition or substance which is capable of exchanging one of its ions either cation or anion, for one of the similarly charged ions of the composition in solution which is passed through and in contact with the ion exchanger, for convenience called the exchanger.

An exchanger for the purposes of this invention is a mass or quantity of an insoluble and permanent material, usually in a granulated, pea, saddle or other relatively divided form, and lying in a batch or bed so arranged as in a tank that solutions can be passed through and in contact with it and it may be either a cation exchanger or an anion exchanger.

The invention can perhaps be best understood in its general principles by the following simple example:

If a strontium Sr— cation is combined with two hydroxyl OH— ions, the composition strontium hydroxide $Sr(OH)_2$ is formed. This composition has the property that at a comparatively low temperature it forms a solid precipitate, but at a comparatively higher temperature it forms a solution. Therefore, if two compositions one containing the hydroxide ion and the other the strontium ion in comparatively weak concentration are brought together in great quantity and at a low temperature, a great deal of the strontium hydroxide will be formed as a solid precipitate. Thereafter, if a small amount of water at elevated temperature is passed through the solid precipitate strontium hydroxide, the precipitate will become solubilized in a high concentration.

We have discovered that this process can be brought about by ion exchange.

Generally speaking, any suitable ion exchangers may be used in the process of our invention which are in or may be exchanged into the form of the ion capable of exchange with ions of the raw material composition involved to form a precipitate having the desired temperature soluble properties. The invention is adaptable to the use of cation or anion exchangers.

The recently developed synthetic resin exchangers from which may be selected those best for the particular process involved according to readily available data are at present most satisfactory, for instance, the sulphonated copolymers of phenol and formaldehyde and the like which are available on the market under the trade name "Amberlite" such as the cation exchangers "Amberlite" IR–105, a sulphonic acid type, "Amberlite" IRC–50, a carboxylic acid type, "Amberlite" 120, a sulphonic acid type, and among the anion exchangers "Amberlite" IRA–400, a strongly basic type.

It will be understood that the ion exchangers, particularly the synthetic resin ion exchangers discussed are well known and that a suitable exchanger may be selected from among such readily available exchangers according to publicly available table data, and their complicated chemical formulas and compositions for the most part need not be dealt with here. For our purposes the cation exchange materials by themselves may be designated by R and the anion exchange materials by themselves may be designated Rx. Throughout the process of this invention a resin cation exchanger when it is used will be in the form of a metallic resinate, for instance, a strontium resinate $SrR_2$ which is interchangeable in form as the process of cation exchange takes place and the anion exchangers when used will be in interchangeable forms of resin bases or salts, for instance, resin hydroxide $RxOH$ or resin oxalate $Rx_2C_2O_4$.

Thus, we may start with an ion exchanger in the strontium resinate form $SrR_2$ and if we pass sodium hydroxide NaOH through it at a comparatively low temperature the sodium ion Na will exchange with the strontium ion Sr converting the exchanger to the sodium resinate form NaR and producing a solid precipitate strontium hydroxide $Sr(OH)_2$ which remains as a solid interspersed in the exchanger and also producing as effluent from the exchanger electrolyte-weakened water. Alternatively, instead of forming the precipitate within the exchanger, we may pass sodium hydroxide at an elevated temperature through the exchanger, thus forming the strontium hydroxide as a solution which passes out as effluent, and then forms the solid precipitate by cooling outside the exchanger.

A compartively small amount of water applied to the precipitate either inside or outside the exchanger will solubilize it at a comparatively high concentration. This concentrate, when passed through the exhausted exchanger, regenerates the latter to the original form and produces the original solution as concentrated effluent.

Example 1.—Concentration of sodium hydroxide

A metal resinate, in the form preferably of the alkali-earth metals strontium or barium when combined with sodium hydroxide at reduced temperature produces a hydroxide of the metal involved, for instance strontium hydroxide $Sr(OH)_2$ as a solid precipitate and converts the exchanger to the sodium form NaR. Such a precipitate is highly soluble at elevated temperature.

Referring to Fig. 1, in a first run cool sodium hydroxide NaOH is fed through a line 12 and passed through a strontium resinate $SrR_2$ form of exchanger in a suitable exchanger tank or apparatus indicated at 10, converting the exchanger to the sodium form NaR and producing the precipitate strontium hydroxide which remains interspersed in the exchanger as a solid, and electrolyte-weakened water is produced as effluent through a line indicated at 15. For the sake of clarity, the first run and its reactions are shown at the left and subsequent runs on the right throughout the drawings. It will be understood that suitable line and valve arrangements can be made to accomplish the desired runs. When the exchanger is completely exhausted to the sodium form NaR so that no more strontium hydroxide precipitate can be produced, the sodium hydroxide feed through the line 12 is shut off and in a second run water $H_2O$, at a temperature which is elevated to the temperature of solubility of the strontium hydroxide is introduced to the exchanger through line 12a. This immediately dissolves the strontium hydroxide and causes a reexchange to take place with the sodium resinate NaR form of exchanger, regenerating the exchanger back to the original strontium resinate $SrR_2$ form and producing concentrated sodium hydroxide as effluent through the line 15a. It may be desirable to run the hot water back through the exchanger in the opposite direction, that is, into line 15a and out of line 12a.

The equations for the reactions taking place in the above process are as follows:

(1) $H_2O + NaOH(\text{dilute, cold}) + SrR_2 \rightarrow \underline{Sr(OH)_2} + H_2O$
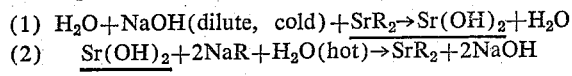

For continuous production, the exchange process is alternated between the sodium hydroxide first run and the hot water second run.

Example 2.—Concentration of sodium chloride

It may be desirable to concentrate a desired electrolyte conveniently by the process of Example 1 where, however, the electrolyte to be concentrated does not have an ion which in the concentration process of Example 1 forms a temperature soluble precipitate. In such case, the electrolyte desired to be concentrated can first be converted to another electrolyte which has an ion capable when combined with the ion carried by the exchanger being used of forming the desired precipitate. Such an example is sodium chloride NaCl.

Referring to Fig. 2, the sodium chloride NaCl is fed through a line 16 into an exchanger tank 18 containing the anion exchanger resin hydroxide RxOH. The chloride ion exchanges with the hydroxyl ion of the exchanger converting the exchanger to the resin chloride RxCl form and producing sodium hydroxide NaOH as effluent through the line 19 in a first run. The sodium hydroxide is passed then into the line 12 in the first run in the apparatus of Fig. 1 producing the solid precipitate and effluent water and in the second run of Fig. 1 the concentrated sodium hydroxide which is then passed from the line 15a into the line 20 of Fig. 2 in a second run, producing from the line 19a the sodium chloride as effluent end product and reconverting the resin chloride form of exchanger back to the resin hydroxide form ready for a succeeding first run through the tank 18.

In this process the end effluent sodium chloride from the line 19a is concentrated because the sodium hydroxide fed into the line 20 from the line 15a of Fig. 1 is also concentrated. In this process also the water effluent from the line 15 may be so electrolyte-weakened as to be potable, depending upon the temperature of the sodium hydroxide fed into the line 12, Fig. 1.

The equations for these reactions are as follows:

(1) $NaCl + RxOH \rightarrow RxCl + NaOH$
(2) $2NaOH(\text{cold}) + SrR_2 \rightarrow 2NaR + \underline{Sr(OH)_2} + H_2O$ (3) $\underline{Sr(OH)_2} + 2NaR + H_2O$ (hot) →
$$SrR_2 + 2NaOH \text{ (concentrated)}$$
(4) NaOH (conc.) + RxCl →
$$NaCl \text{(concentrated)} + RxOH$$

where Rx is anion exchanger and R is cation exchanger.

*Example 3.—Concentration of several salts in solution (sea water)*

It may be desirable to concentrate several salts in a solution and to produce electrolyte-weakened or potable water, for instance, from sea water.

Assuming for illustrative purposes that the composition of sea water is a mixture of sodium chloride and magnesium chloride and referring to Fig. 3, the mixture NaCl and MgCl₂ is passed in a first run through a line 20a into an exchanger tank 22 containing the sodium NaR form of resin. The magnesium chloride exchanges with the sodium resinate to form magnesium resinate MgR₂ and pure sodium chloride NaCl as effluent through the line 24. From the line 24 the sodium chloride is fed into the line 16 of Fig. 2 in a first run to form sodium hydroxide effluent from the line 19 which is then concentrated by feeding it into the line 12 of Fig. 1 according to Example 1. The concentrated sodium hydroxide effluent from the line 15a is passed through the line 20 in Fig. 2 producing concentrated sodium chloride NaCl effluent from the line 19a of Fig. 2 according to Example 2, which is then fed in a second run through the line 26 of Fig. 3 through the magnesium resinate MgR₂ form of exchanger, re-exchanging the latter back to the sodium NaR form and producing the magnesium chloride and sodium chloride mixture of the original solution but in concentrated form through the line 28, Fig. 3.

The equations for this example are as follows:

(1) $MgCl_2 + NaCl + 2NaR → MgR_2 + 3NaCl$
(2) $NaCl + RxOH → NaOH + RxCl$
(3) $2NaOH \text{ (dilute, cold)} + SrR_2 →$
$$Sr(OH)_2 + 2NaR + \text{water}$$
(4) $Sr(OH)_2 + 2NaR + H_2O$ (hot) →
$$SrR_2 + 2NaOH \text{ (conc.)}$$
(5) NaOH (conc.) + RxCl → NaCl (conc.) + RxOH
(6) $3NaCl \text{ (conc.)} + MgR_2 →$
$$MgCl_2 \text{ (conc.)} + NaCl + 2NaR$$

*Example 4.—Concentrated sodium hydroxide and electrolyte-weakened water from sea water*

It may be desirable to obtain from sea water or other mixed salt solution concentrated sodium hydroxide and water which can be made potable, and the process is illustrated in Fig. 4, taking sea water for this purpose to be comprised of sodium chloride NaCl and magnesium chloride MgCl₂. This mixture of salts is fed through a line 30 into an exchanger tank 32 container a resin hydroxide RxOH form of exchanger. The exchanger becomes resin chloride RxCl, a solid precipitate magnesium hydroxide Mg(OH)₂ is produced interspersed and remaining in the exchanger and sodium hydroxide NaOH is the effluent through the line 34. The latter may then be concentrated as in Example 1 by feeding it into the line 12 of the exchanger tank 10 in Fig. 1 and after the second run producing concentrated sodium hydroxide through the line 15a, Fig. 1.

Now the solid precipitate magnesium hydroxide must be dissolved out of the exchanger and the exchanger regenerated back to the resin hydroxide form. For this purpose, copper ammonium chloride Cu(NH₃)₂Cl is fed into the resin chloride form of exchanger in a second run through a line 36 which leaves the exchanger still in the resin chloride form but produces the solid precipitate copper hydroxide Cu(OH)₂ in the exchanger and magnesium chloride and free ammonia as effluent through the line 38.

Copper ammonium hydroxide Cu(NH₃)₂(OH)₂ is now fed to the resin chloride exchanger and copper hydroxide precipitate in a third run through the line 40, regenerating the exchanger back to the resin hydroxide RxOH form ready for the first run, dissolving the copper hydroxide and producing as effluent through the line 42 copper ammonium chloride Cu(NH₃)₂Cl. The copper ammonium chloride for the second run may be led from the line 42 directly back into the line 36 and the remainder may be passed into mixing apparatus 50 where calcium hydroxide Ca(OH)₂ is introduced through the line 51 to form calcium chloride CaCl₂ solution as effluent through the line 53 and the copper ammonium hydroxide Cu(NH₃)₂(OH)₂ which is fed through the line 40 for the third run.

If desired, the magnesium chloride effluent from the line 38 in Fig. 4 can also be concentrated by passing it progressively through the exchangers of Figs. 3, 2 and 1 and back again, thereby converting it first to sodium chloride, then to sodium hydroxide which is concentrated and then reconverting it to the magnesium chloride in concentrated form.

The equations for the reactions of this example are as follows:

(1) $NaCl + MgCl_2 + RxOH →$
$$NaOH + \underline{Mg(OH)_2} + RxCl$$
NaOH is concentrated by process of Example 1.
(2) $\underline{Mg(OH)_2} RxCl + Cu(NH_3)_2Cl →$
$$\underline{Cu(OH)_2} + RxCl + MgCl_2 + 2NH_3$$
(3) $2RxCl + \underline{Cu(OH)_2} + 2NH_3 →$
$$2RxOH + Cu(NH_3)_2Cl_2$$
(4) $Cu(NH_3)_2Cl_2 + Ca(OH)_2 →$
$$Cu(OH)_2 + 2NH_3 + CaCl_2$$

*Example 5.—Concentration by anion exchange*

Fig. 5 illustrates an example of concentration of strontium hydroxide SrOH by an anion exchanger.

The strontium hydroxide is fed in a first run through a line 60 into a tank 62 containing resin oxalate Rx₂C₂O₄ form of exchanger. The exchanger becomes resin hydroxide RxOH, and strontium oxalate SrC₂O₄ is formed as a solid precipitate in the exchanger and electrolyte-weakened water is the effluent through a line 63. Then hot water is passed in a second run through the line 60a, the exchanger reverts to the original form resin oxylate, the precipitate is dissolved and concentrated strontium hydroxide Sr(OH)₂ is produced as effluent through the line 63a.

The equations for the above reactions are as follows:

(1) $Sr(OH)_2 \text{ (cold dilute)} + Rx_2C_2O_4 →$
$$2RxOH + \underline{SrC_2O_4} + \text{water}$$
(2) $H_2O \text{ (hot)} + 2RxOH + \underline{SrC_2O_4} →$
$$Sr(OH)_2 \text{ (conc.)} + Rx_2C_2O_4$$

*Example 6.—Separation and concentration of one of the salts in a mixture*

Fig. 6 ilustrates a process by which one of several salts in a solution can be isolated and concentrated at the same time. For example, a mixture in solution of sodium chloride NaCl and strontium chloride SrCl₂ is passed in a first run through the line 70 into a tank 75 containing resin hydroxide RxOH form of exchanger. The exchanger becomes resin chloride RxCl and strontium hydroxide $\underline{Sr(OH)_2}$ is formed as a solid precipitate remaining in the exchanger. The sodium chloride runs on through and out of the line 76 as effluent. By passing hot water in a second run through the line 70a the precipitate is dissolved thereby exchanging the resin chloride back to the resin hydroxide form of exchanger and producing as effluent through the line 76a concentrated strontium chloride.

The equations for this reaction are as follows:

(1) $NaCl + SrCl_2 + 2RxOH →$
$$2RxCl + \underline{Sr(OH)_2} + NaCl$$

(2) $2RxCl + Sr(OH)_2 + H_2O$ (hot) →
$2RxOH + SrCl_2$ (conc.)

*Example 7.—Chromatic or cascading concentration*

The previous examples have illustrated concentration processes by the formation of only one temperature soluble precipitate. Such single precipitate processes exchange and precipitate most but not all of the reactant solutions passing through the exchanger and the electrolyte weakened water effluent is partially but not entirely pure.

Referring to Figures 7 and 8, the present example illustrates a method of removal and concentration of electrolytes with an extremely high concentration of the electrolytes and substantially pure water as effluent. In such a method the solution to be concentrated is passed successively through a cascading or chromatic series of exchangers, all capable of combining with the electrolytes of the solution and forming precipitates having progressive temperature ranges of solubility.

This method may be illustrated in the concentration of a sodium chloride NaCl solution in which, referring to Fig. 7, the sodium chloride is passed in a first run through a line 80 into an exchanger tank 82 containing resin bromate form of exchanger $RxBrO_3$. The exchanger reverts to a resin chloride RxCl form producing sodium bromate $NaBrO_3$ as effluent through the line 84. Now referring to Fig. 8, the sodium bromate is passed from the line 84 and fed through a line 90 in a first run to an exchanger tank 92 containing successive layers of exchanger in the forms, respectively, cesium resinate CsR, barium resinate $BaR_2$, and thallium resinate TlR. In passing through the cesium resinate, most of the solution is exchanged to sodium resinate NaR and precipitated as solid cesium bromate $CsBrO_3$. The greatly weakened sodium bromate solution passes on through the barium resinate, exchanging the latter to sodium resinate and precipitating as a solid barium bromate $Ba(BrO_3)_2$. The almost dilute remaining sodium bromate solution hence passes through the thallium resinate exchanger which reverts to the sodium resinate NaR form, forming the solid precipitate thallium bromate $TlBrO_3$ and finally resulting in substantially pure water as effluent through the line 95. Each stage may contain sodium ion in admixture with cesium, barium, or thallium.

At this point it may be stated that where the effluent water produced by concentration processes forming single precipitates, as illustrated by the previous examples, is not pure enough to be potable or otherwise useable for purposes requiring substantially pure water, a suitable chromatic or cascading concentration process as illustrated by the present method may be used.

In a second run through the exchanger tank 92 hot water in comparatively small quantities is fed through the line 95a in reverse direction with respect to the original order of the exchangers in the tank 92, successively dissolving the thallium bromate, the barium bromate, and the cesium bromate, regenerating the layers of sodium resinate successively to thallium resinate, barium resinate, and cesium resinate and producing through the line 90a as effluent concentrated sodium bromate $NaBrO_3$. The latter may then be fed through the line 80a into the tank 82 in Fig. 7, regenerating the resin chloride to the resin bromate $RxBrO_3$ form and producing as end product effluent through the line 84a concentrated sodium chloride.

The equations for the above reactions are as follows:

(1) $NaCl + RxBrO_3 \rightarrow RxCl + NaBrO_3$ (2) $NaBrO_3$ (cold, dilute) $+ CsR \rightarrow$
$NaR + CsBrO_3 + NaBrO_3$ (more dilute)

(3) $NaBrO_3$ (more dilute) $+ BaR_2 \rightarrow$
$NaR + Ba(BrO_3)_2 + NaBrO_3$ (still more dilute)

(4) $NaBrO_3$ (still more dilute) $+ TlR \rightarrow$
$NaR + TlBrO_3 +$ (pure water)

(5) $NaR + TlBrO_3 + H_2O$ (hot) →
$TlR + NaBrO_3$ (hot, concentrated)

(6) $NaR + Ba(BrO_3)_2 + NaBrO_3$ (hot, concentrated) →
$BaR_2 + NaBrO_3$ (hot, still more concentrated)

(7) $NaR + CsBrO_3 + NaBrO_3$ (hot, still more concentrated) → $CsR + NaBrO_3$ (fully concentrated)

(8) $NaBrO_3$ (conc.) $+ RxCl \rightarrow$
$RxBrO_3 NaCl$ (concentrated)

*Example 8.—Concentration of magnesium chloride from sea water*

Fig. 9 illustrates an alternative method for production of concentrated magnesium chloride from sea water according to the invention, taking sea water as comprising sodium chloride and magnesium chloride. The sea water is passed in a first run through a line 100 into a tank 102 containing resin iodate $RxIO_3$ form of exchanger. The latter reverts to a resin chloride RxCl form and the solid precipitate sodium iodate $NaIO_3$ is formed in the exchanger, producing as effluent through the line 104 a solution of a more dilute form of sodium chloride and magnesium chloride which, in turn, is fed into an exchanger tank 106 containing a sodium NaR form of resinate producing magnesium resinate $MgR_2$ and dilute sodium chloride as an effluent from the line 108.

In a second run a small amount of hot water is passed through the line 100a into the tank 102 dissolving the sodium iodate, reverting the resin chloride exchanger to the resin iodate form and producing sodium chloride as effluent in the line 110 which is then fed in the second run into the tank 106, exhausting the magnesium resinate exchanger back to the sodium NaR form and producing in the line 112 the desired concentrated magnesium chloride.

The equations for the above reactions are as follows:

(1) $2NaCl + MgCl_2 + RxIO_3 \rightarrow$
$RxCl + NaIO_3 + NaCl$ (more dilute) $+ MgCl_2$ (2) $NaIO_3 + RxCl + H_2O$ (hot, conc.) →
$NaCl$ (conc.) $+ RxIO_3$ (3) $MgCl_2 + 2NaR + NaCl \rightarrow MgR_2 + 3NaCl$ (4) $2NaCl$ (conc.) $+ MgR_2 \rightarrow MgCl_2$ (conc.) $+ 2NaR$

*Example 9.—Concentration of sodium hydroxide in the process of Example 8*

The dilute sodium chloride from the line 108 in Fig. 9 may be passed through a line 115 Fig. 10 in a first run to an exchanger tank 120 containing resin hydroxide form of exchanger. This exhausts the exchanger to the resin chloride RxCl form and produces as effluent through line 122 dilute sodium hydroxide. The latter is passed through the apparatus of Fig. 1 and treated according to the process of Example 1 to produce the end product sodium hydroxide.

The resin chloride exchanger is regenerated back to the resin hydroxide form in the tank 120 with any suitable hydroxide herein designated AOH passed through the line 124, producing as effluent a chloride designated ACl in the line 126. The chloride ACl may be recuperated in any suitable manner, as by treatment in apparatus 128 with a suitable hydroxide designated XOH introduced in the line 130 and with a waste effluent chloride designated XCl from the line 132. Such a recuperation method is shown in the copending application of Godfrey filed March 31, 1950, Serial No. 153,219, now abandoned, and is also substantially the method of regeneration and recuperation illustrated in Fig. 4 of the present application.

*Example 10.—Simultaneous conversion and precipitation in mixture of exchangers*

In previous examples, for instance, in Example 2, where the electrolyte to be concentrated did not have an ion capable of forming a temperature soluble precipitate by a single exchange process, the electrolyte was first converted to a desirable form as in Fig. 2.

This preliminary conversion process may, however, be carried out simultaneously with a formation of the precipitate in a single exchange step using a mixture of exchangers which accomplish the desired result.

Referring to Fig. 11 sodium chloride which is to be concentrated is fed in a first run through a line 140 into an exchanger tank 142 containing a mixture of the cation exchanger cesium resinate CsR and anion exchanger resin bromate $RxBrO_3$. Exchange of the sodium and chloride ions takes place simultaneously with the two forms of exchanger which become sodium resinate NaR and resin chloride RxCl thereby producing the solid precipitate cesium bromate $CsBrO_3$ and electrolyte-weakened water as effluent through the line 144. When the exchanger has become thus exhausted the usual small amount of hot water is now fed into the line 140a causing the exchangers to revert back to their original form cesium resinate and resin bromate and producing concentrated sodium chloride as effluent end product through the line 144a.

Throughout the above examples as illustrated in the drawings the solid precipitates have been shown as formed within and interspersed in the exchanger itself since the original solutions were fed through the exchangers at temperatures whereby precipitation immediately took place. As mentioned above, however, if desired the precipitates may be formed as solids outside of the exchanger by passing the original solutions through the exchangers in the first runs at temperatures of solubility of the precipitates. This causes the solution of the desired precipitates to pass out of the exchangers in the effluent after which precipitation can be brought about by subjecting the effluent to a temperature differential, usually cooling. In such cases the usually hot water used for concentration purposes is first introduced to the precipitate causing the latter to solubilize after which the resulting solution is passed back through the exchanger to form the desired original electrolyte in concentrated form.

Where the cascading or chromatic concentration process is used, if it is desired to form the solid precipitates outside of the exchangers these precipitates may be formed between stages of the concentration process.

It will also be understood that when the cascading concentration process is used, the electrolyte effluent from each successive stage may be converted to another more desirable electrolyte before it is passed into a succeeding stage for the formation of a temperature soluble precipitate of decreasing solubility.

We claim:

1. The process of concentrating an electrolyte solution comprising the step of passing a first solution of said electrolyte through a solid ion exchanger bed having exchangeable ions which form with one of the ions of said electrolyte a compound which is highly water soluble at elevated temperatures and highly water insoluble at lower temperatures, thereby producing a solution of said compound and converting said exchanger to an exhausted form having as exchangeable ions the remaining ions of said electrolyte, maintaining the temperature of said compound at a temperature at which said compound precipitates as a solid, thereby precipitating said compound as a solid, dissolving said precipitated compound with an amount of water which is smaller than the amount of water in said first electrolyte solution and at a temperature which is sufficiently high to dissolve said precipitated compound in said amount of water, thereby forming a second solution of said compound, and then passing through said exhausted exchanger said second solution of said compound, thereby producing a second solution of said electrolyte which is more concentrated than said first solution of said electrolyte and regenerating said exchanger to its original form for reuse for passing more of said first electrolyte solution therethrough.

2. A process for concentrating electrolyte solutions comprising passing a first solution of said electrolyte through a solid ion exchanger bed having exchangeable ions which form with one of the ions in said electrolyte a compound which is highly water soluble at elevated temperatures and highly water insoluble at lower temperatures, thereby producing said compound and converting said exchanger to an exhausted form having as exchangeable ions the remaining ions of said electrolyte, maintaining the temperature of said first electrolyte solution while being passed through said ion exchanger bed at a temperature which is sufficiently reduced to precipitate said compound as a solid from said solution thereof, whereby said compound is precipitated as a solid upon said ion exchanger as said solution thereof is formed, passing water in an amount smaller than the amount of water contained in said first electrolyte solution and at a temperature which is sufficiently high to dissolve said precipitated compound in said smaller amount of water, through said exhausted ion exchanger with said compound precipitated thereupon, thereby dissolving said precipitated compound and forming a second solution thereof which regenerates said exchanger to its original form and produces a second electrolyte solution which is more concentrated than said first electrolyte solution.

3. A process for concentrating an alkali metal hydroxide solution comprising passing a first solution of said alkali metal hydroxide through a cation exchanger in the form of a resinate of an alkaline earth metal selected from the group consisting of barium and strontium, to produce a solution of the hydroxide of said alkaline earth metal and converting said alkaline earth metal resinate into an alkali metal resinate, precipitating as a solid said alkaline earth metal hydroxide from said solution thereof by maintaining the temperature of the same at a temperature sufficiently reduced to cause precipitation of said compound as a solid from said solution, dissolving said precipitated alkaline earth metal hydroxide in an amount of water which is less than the amount of water contained in said first electrolyte solution and at a temperature which is sufficiently high to dissolve said precipitated compound in said lesser amount of water, thereby forming a second solution of said alkaline earth metal hydroxide, and passing said second solution of said alkaline earth metal hydroxide through said alkali metal resinate, thereby regenerating said alkali metal resinate back to its original form and producing as an effluent a second solution of said alkali metal hydroxide which is more concentrated than said first solution thereof.

4. A process for concentrating an alkali metal hydroxide solution comprising passing a first solution of said alkali metal hydroxide through a cation exchanger in the form of a resinate of an alkaline earth metal selecting from a group consisting of barium and strontium to produce a solution of the hydroxide of said alkaline earth metal, and converting said alkaline earth metal resinate into an alkali metal resinate, maintaining the temperature of said first solution of said electrolyte while being passed through said cation exchanger bed at a temperature sufficiently reduced to precipitate said alkaline earth metal compound from said solution thereof, whereby said alkaline earth metal hydroxide is precipitated as a solid upon said ion exchanger as said solution thereof is formed, passing water in an amount less than the amount of water in said first electrolyte solution and at a temperature which is sufficiently high to dissolve said precipitated alkaline earth metal hydroxide in said smaller amount of water, through said exhausted ion exchanger with said alkaline earth metal hydroxide precipitated thereupon, thereby dissolving said alkaline earth metal hydroxide and forming a second solution thereof, which regenerates said alkali metal resinate ion exchanger back to its original form of said alkaline earth metal resinate and produces a second solution of said alkali metal hydroxide which is more concentrated than said first solution thereof.

References Cited in the file of this patent

UNITED STATES PATENTS

| | | |
|---|---|---|
| 1,026,724 | Trump | May 21, 1912 |
| 1,799,989 | Russberg | Apr. 7, 1931 |
| 2,409,861 | Hunter et al. | Oct. 22, 1946 |
| 2,606,098 | Bauman | Aug. 5, 1952 |